(12) United States Patent
Matsuo et al.

(10) Patent No.: US 10,392,071 B2
(45) Date of Patent: Aug. 27, 2019

(54) ELECTRIC COMPONENT SUPPORT STRUCTURE FOR SADDLE RIDE VEHICLE

(71) Applicant: HONDA MOTOR CO., LTD., Minato-ku, Tokyo (JP)

(72) Inventors: Tomoya Matsuo, Wako (JP); Yuji Noguchi, Wako (JP); Tomohiko Yashiro, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 92 days.

(21) Appl. No.: 15/708,572

(22) Filed: Sep. 19, 2017

(65) Prior Publication Data

US 2018/0093734 A1  Apr. 5, 2018

(30) Foreign Application Priority Data

Sep. 30, 2016  (JP) .................................. 2016-193676

(51) Int. Cl.
| | |
|---|---|
| *B62K 11/04* | (2006.01) |
| *B60K 11/04* | (2006.01) |
| *B60K 11/08* | (2006.01) |
| *B62J 99/00* | (2009.01) |
| *G01C 19/5783* | (2012.01) |
| *F01P 3/18* | (2006.01) |
| *F01P 3/20* | (2006.01) |

(52) U.S. Cl.
CPC .............. *B62K 11/04* (2013.01); *B60K 11/04* (2013.01); *B60K 11/08* (2013.01); *B62J 99/00* (2013.01); *B60Y 2200/12* (2013.01); *B62J 2099/004* (2013.01); *B62K 2207/02* (2013.01); *F01P 3/18* (2013.01); *F01P 3/20* (2013.01); *F01P 2050/16* (2013.01); *G01C 19/5783* (2013.01)

(58) Field of Classification Search
CPC ........... B62K 11/04; B60K 11/04; B62J 99/00
See application file for complete search history.

(56) References Cited

U.S. PATENT DOCUMENTS

| | | | |
|---|---|---|---|
| 4,011,921 A | 3/1977 | Sakamoto et al. | |
| 2007/0193805 A1* | 8/2007 | Adachi ................. | B62K 11/04 180/219 |
| 2007/0193812 A1* | 8/2007 | Adachi ................. | F01N 13/08 180/309 |
| 2009/0242295 A1 | 10/2009 | Hosoda | |

(Continued)

FOREIGN PATENT DOCUMENTS

| | | |
|---|---|---|
| EP | 2 990 318 A1 | 3/2016 |
| JP | H10-147275 A | 6/1998 |

(Continued)

OTHER PUBLICATIONS

Japanese Office Action, with the English machine translation thereof, dated Aug. 7, 2018, in the corresponding JP Patent Application 2016-193676.

(Continued)

*Primary Examiner* — Kevin Hurley
(74) *Attorney, Agent, or Firm* — Carrier Blackman & Associates, P.C.; William D. Blackman; Joseph P. Carrier

(57) ABSTRACT

In the electric component support structure for the saddle ride vehicle including a body frame F that supports a water-cooled engine, and a radiator that is supported on the body frame through collars, a gyro sensor is fixed to electric component support pieces provided on the radiator.

8 Claims, 6 Drawing Sheets

(56) References Cited

U.S. PATENT DOCUMENTS

| | | | |
|---|---|---|---|
| 2009/0255748 A1 | 10/2009 | Fujiwara | |
| 2013/0026784 A1 | 1/2013 | Maeda et al. | |
| 2014/0116794 A1* | 5/2014 | Kawai | B62K 11/04 180/68.1 |
| 2014/0353061 A1* | 12/2014 | Iida | B60K 15/07 180/220 |
| 2015/0000616 A1* | 1/2015 | Yamashiro | F01P 11/04 123/41.01 |
| 2015/0008061 A1* | 1/2015 | Matsuda | B62K 11/04 180/220 |
| 2015/0014079 A1* | 1/2015 | Takasaki | B62J 23/00 180/229 |
| 2015/0014080 A1* | 1/2015 | Takasaki | B62J 15/00 180/229 |
| 2015/0107923 A1* | 4/2015 | Inayama | B60K 11/04 180/229 |
| 2015/0114744 A1* | 4/2015 | Naruoka | F02M 35/14 180/219 |
| 2016/0244116 A1* | 8/2016 | Komatsu | B62J 23/00 |
| 2016/0244119 A1* | 8/2016 | Ishida | B62K 11/04 |
| 2016/0264201 A1* | 9/2016 | Inomata | B62J 37/00 |
| 2017/0001674 A1* | 1/2017 | Ishii | B62J 6/02 |
| 2017/0057583 A1* | 3/2017 | Yokoyama | B62K 5/027 |
| 2017/0113758 A1* | 4/2017 | Hamaguchi | B62K 11/04 |
| 2017/0114705 A1* | 4/2017 | Suzuki | F01M 11/03 |
| 2017/0114709 A1* | 4/2017 | Okita | F02B 29/0406 |

FOREIGN PATENT DOCUMENTS

| | | | | |
|---|---|---|---|---|
| JP | 2015-054606 A | | 3/2015 | |
| JP | 2015054606 | * | 3/2015 | ............. B62J 99/00 |

OTHER PUBLICATIONS

Extended European search report dated Feb. 13, 2018 in the corresponding EP patent application 17192355.0.

* cited by examiner

ELECTRIC COMPONENT SUPPORT STRUCTURE FOR SADDLE RIDE VEHICLE

INCORPORATION BY REFERENCE

The present application claims priority under 35 U.S.C. § 119 to Japanese Patent Application No. 2016-193676 filed on Sep. 30, 2016. The content of the application is incorporated herein by reference in its entirety.

TECHNICAL FIELD

The present invention relates to an electric component support structure for a saddle ride vehicle.

BACKGROUND ART

Heretofore, a saddle ride vehicle has been known which includes a radiator supported on a body frame through an elastic body, and an electric component supported by a bracket provided on the vehicle body side (see, for example, Patent Document 1).

PRIOR ART DOCUMENT

Patent Document

[Patent Document 1]
Japanese Patent Laid-Open No. Hei 10-147275

SUMMARY OF THE INVENTION

Problem to be Solved by the Invention

Meanwhile, in a saddle ride vehicle, it is desirable to support an electric component in such a manner that vibrations do not influence the electric component. In this case, an elastic body for exclusive use for supporting the electric component is needed, leading to an increase in the number of component parts.

The present invention has been made in consideration of the above-mentioned circumstances. Accordingly, it is an object of the present invention to enable an electric component to be elastically supported with a simple structure, in an electric component support structure for a saddle ride vehicle.

Means for Solving the Problem

In order to achieve the above object, according to an aspect of the present invention, there is provided an electric component support structure for a saddle ride vehicle including a body frame (F) that supports a water-cooled engine (10), and a radiator (41L) supported on the body frame (F) through an elastic body (119, 123). An electric component (130) is fixed to an electric component support piece (131) provided on the radiator (41L).

According to the configuration of the aspect of the present invention, the saddle ride vehicle includes the radiator supported on the body frame through the elastic body, and the electric component is fixed to the electric component support piece provided on the radiator. As a result, the electric component fixed to the radiator by the electric component support piece is supported on the body frame through the elastic body for the radiator. Therefore, it is unnecessary to provide an elastic body for exclusive use for the electric component, so that the electric component can be elastically supported with a simple structure.

In addition, in the electric component support structure according to an aspect of the present invention, a configuration may be adopted in which the body frame (F) includes a head pipe (17) that supports a front wheel (2) through a front fork (11), and a down frame (19) extending downward from the head pipe (17), and the radiator (41L) is disposed on a lateral side of the down frame (19).

According to the configuration of the aspect of the present invention, the radiator is disposed on a lateral side of the down frame that extends downward from the head pipe. Therefore, the electric component can be elastically supported on the lateral side of the down frame by utilizing the radiator.

Besides, in the electric component support structure according to an aspect of the present invention, a configuration may be adopted in which the radiator (41L) includes an upper tank (111) provided at an upper portion, a lower tank (112) provided at a lower portion, and a core (113) interconnecting the upper tank (111) and the lower tank (112), and the electric component support piece (131) is provided on the upper tank (111).

According to the configuration of the aspect of the present invention, the electric component support piece is provided on the upper tank of the radiator. Therefore, the electric component can be disposed at a high position, and staining of the electric component can be restrained.

Further, in the electric component support structure according to an aspect of the present invention, a configuration may be adopted in which a fuel tank (42) is provided on a rear side of the radiator (41L), and a radiator shroud (50) is provided on a lateral outer side of the radiator (41L), and the electric component (130) is disposed in a space (S) that is covered with the radiator shroud (50) on a lateral outer side, covered with the fuel tank (42) on a rear side, and covered with the radiator (41L) on a lower side.

According to the configuration of the aspect of the present invention, the electric component is disposed in the space that is covered with the radiator shroud on the lateral outer side, covered with the fuel tank on the rear side, and covered with the radiator on the lower side. Therefore, the electric component can be protected in the manner of covering it with the radiator shroud, the fuel tank, and the radiator.

In addition, in the electric component support structure according to an aspect of the present invention, a configuration may be adopted in which an upper end (50b) of the radiator shroud (50) extends upward to above the electric component (130).

According to the configuration of the aspect of the present invention, the upper end of the radiator shroud extends upward to above the electric component. Therefore, the electric component can be effectively covered with the radiator shroud, and the electric component can be protected by the radiator shroud.

Besides, in the electric component support structure according to an aspect of the present invention, a configuration may be adopted in which a pair of the radiators are provided on left and right sides of the down frame (19), and a water supply port (156) is provided at an upper surface of the radiator (41R) on one side, whereas the electric component support piece (131) is provided at an upper surface of the radiator (41L) on an other side.

According to the configuration of the aspect of the present invention, the water supply port is provided at the upper surface of the radiator on one side, of the radiators on the left and right sides, whereas the electric component support piece is provided at the upper surface of the radiator on the other side. Therefore, the electric component can be supported through effective utilization of a space near the upper surface of the radiator that is not provided with the water supply port.

In addition, in the electric component support structure according to an aspect of the present invention, a configuration may be adopted in which the electric component support piece (131) is provided projecting from a surface of the radiator (41L), and the electric component (130) is supported in a state of being spaced from the surface of the radiator (41L).

According to the configuration of the aspect of the present invention, the electric component support piece is provided projecting from the surface of the radiator, and the electric component is supported in the state of being spaced from the surface of the radiator. Therefore, the quantity of heat transferred from the radiator to the electric component can be reduced.

Effects of the Invention

In the electric component support structure according to the aspect of the present invention, it is unnecessary to provide an elastic body for exclusive use for the electric component, and the electric component can be elastically supported with a simple structure.

In addition, the electric component can be elastically supported on a lateral side of the down frame.

Besides, the electric component can be disposed at a high position, and staining of the electric component can be restrained.

Further, the electric component can be protected in the manner of covering it with the radiator shroud, the fuel tank, and the radiator.

In addition, the electric component can be effectively protected by the radiator shroud that extends upward to above the electric component.

Besides, the electric component can be supported through effective utilization of a space near the upper surface of the radiator that is not provided with the water supply port.

In addition, the quantity of heat transferred from the radiator to the electric component can be reduced.

MODE FOR CARRYING OUT THE INVENTION

Figure 1:
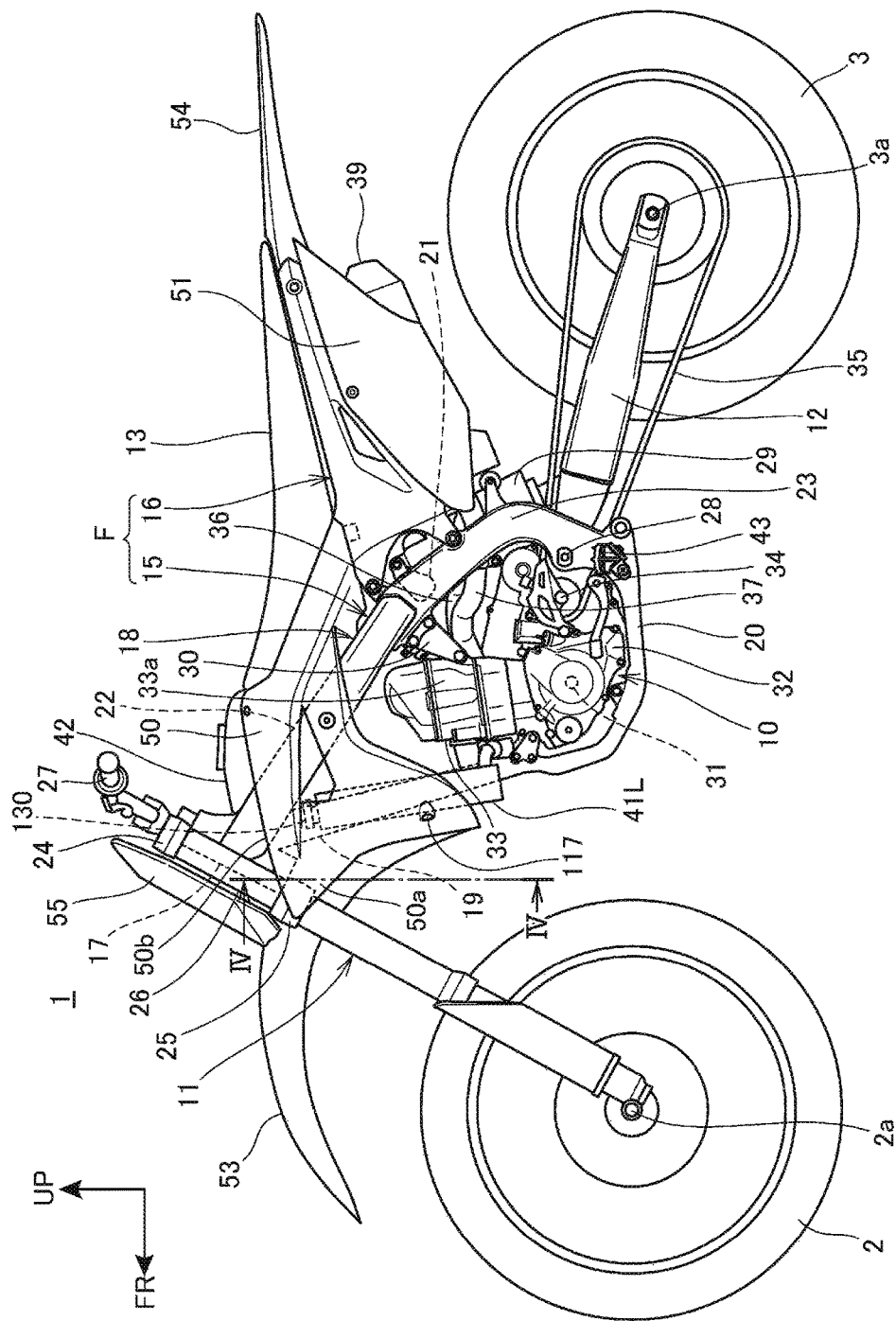
FIG. 1 is a left side view of a motorcycle according to an embodiment of the present invention.

An embodiment of the present invention will be described below referring to the drawings. Note in the following description, the directions such as the forward, rearward, leftward, rightward, upward, and downward directions are the same as the directions with reference to a vehicle body, unless otherwise specified. In addition, in each of the drawings, symbol FR indicates the front side of the vehicle body, symbol UP indicates the upper side of the vehicle body, and symbol LH indicates the left-hand side of the vehicle body.

Figure 2:
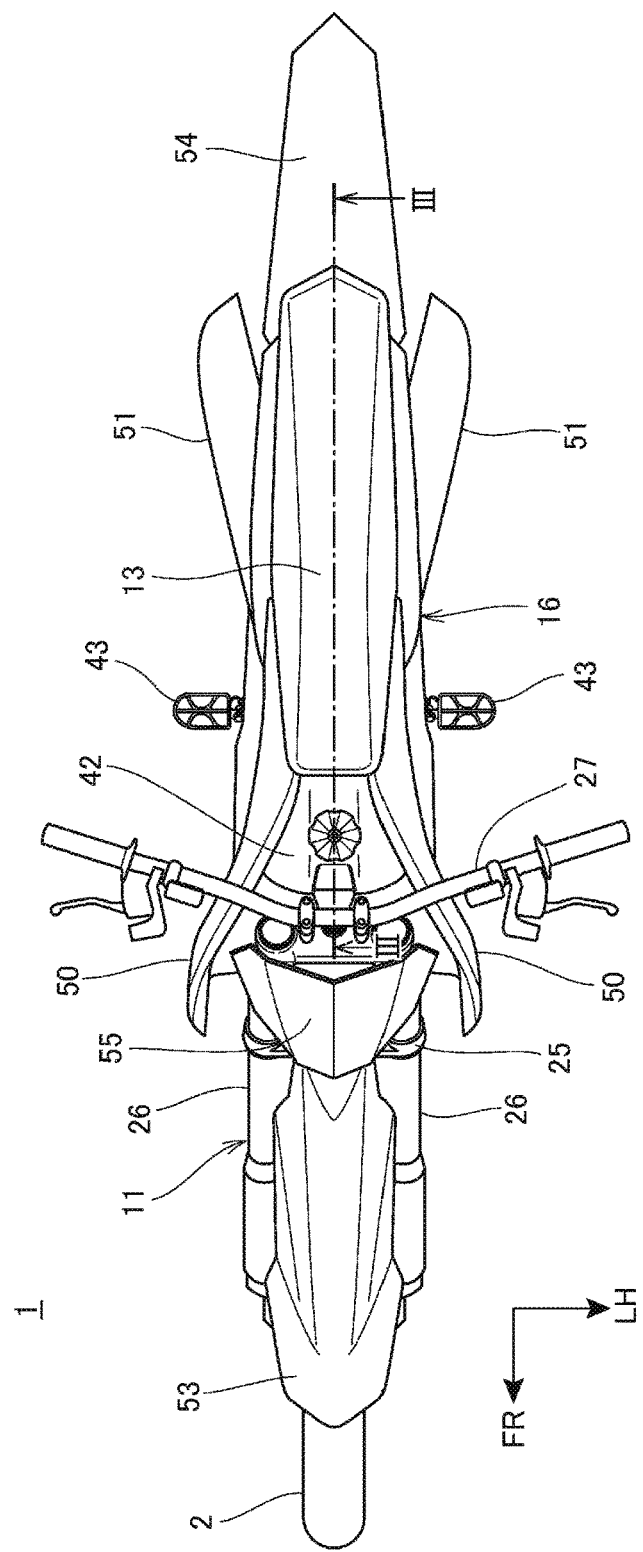
FIG. 2 is a plan view of the motorcycle as viewed from above.

FIG. 1 is a left side view of a motorcycle 1 according to an embodiment of the present invention. FIG. 2 is a plan view of the motorcycle 1 as viewed from above. Note that in FIG. 1, of components provided in a left-right pair, only the left one inclusive of its symbol is depicted.

The motorcycle 1 is a vehicle in which an engine 10 as a power unit is supported on a body frame F, a front fork 11 supporting a front wheel 2 in a steerable manner is steerably supported on a front end of the body frame F, and a rear fork 12 supporting a rear wheel 3 is provided on the rear portion side of the body frame F. The motorcycle 1 is a saddle ride vehicle in which a seat 13 on which the driver is seated astride is provided on an upper side of a rear portion of the body frame F.

The body frame F includes a front frame 15 supporting the engine 10, which is an internal combustion engine, and a rear frame 16 extending rearward from the front frame 15.

The front frame 15 includes a head pipe 17 provided at a front end, a pair of left and right main frames 18, a down frame 19, a pair of left and right lower frames 20, and a cross frame 21 interconnecting the main frames 18 in the transverse direction. The front frame 15 is formed of a metal such as an aluminum alloy, for example.

More specifically, the main frames 18 integrally include a pair of left and right main tubes 22 extending rearwardly downward from a rear surface of the head pipe 17, and a pair of left and right pivot frames 23 extending rearwardly downward from rear ends of the main tubes 22 at a steeper inclination than the main tubes 22. At their front end portions, the main frames 18 extend rearwardly downward with their transverse spacing gradually increased, and, at their rear portions, the main frames 18 extend rearwardly downward substantially in parallel to each other.

The down frame 19 has an upper end portion connected to a rear portion of the head pipe 17 and front end portions of the main frames 18 at positions on the lower side of the main frames 18, and extends rearwardly downward at a steeper inclination than the main frames 18. The down frame 19 is a single frame extending through a center in regard of the transverse direction.

The pivot frames 23 extend downward from rear ends of the main tubes 22 at a steeper downwardly rearward inclination than the main tubes 22. The cross frame 21 interconnects upper end portions of the pivot frames 23 in the transverse direction.

The lower frames 20 branch to the left and right sides from a lower end portion of the down frame 19, then extend downward, are thereafter bent and extend rearward, to be connected to lower end portions of the pivot frames 23.

The rear frame 16 has a front end portion connected to rear portions of the main frames 18, and extends rearward.

The front fork 11 includes a steering shaft 17a (FIG. 3) rotatably supported on the head pipe 17, a top bridge 24 fixed to an upper end of the steering shaft 17a, a bottom bridge 25 fixed to a lower end of the steering shaft 17a, and fork tubes 26 disposed in a pair on the left and right sides of the head pipe 17 and supported by the top bridge 24 and the bottom bridge 25.

The front wheel 2 is rotatably supported on a front wheel axle 2a provided at lower end portions of the fork tubes 26. A handlebar 27 used by the driver for steering the front wheel 2 is attached to the top bridge 24.

The rear fork 12 formed in an arm shape extending rearward has a front end portion rotatably supported on a pivot shaft 28 interconnecting rear end portions of the left and right pivot frames 23 in the transverse direction, and is swung up and down with the pivot shaft 28 as a center. The rear wheel 3 is rotatably supported on a rear wheel axle 3a inserted and passed through a rear end portion of the rear fork 12.

A rear suspension 29 is arranged between a front portion of the rear fork 12 and the cross frame 21.

The engine 10 is disposed inside the front frame 15 formed in a frame-like shape in side view, and is supported by the front frame 15. An engine hanger 30 extending forwardly downward is fixed to vertically intermediate portions of the main frames 18.

The engine 10 includes a crankcase 32 supporting a crankshaft 31 extending in the transverse direction, and a cylinder section 33 extending upward from a front portion of the crankcase 32. A transmission is incorporated in a rear portion of the crankcase 32. The engine 10 is of a water-cooled type.

A front end portion of the engine hanger 30 is connected to a rear portion of a cylinder head 33a of the cylinder section 33.

An output of the engine 10 is transmitted to the rear wheel 3 through a chain 35 arranged between an output shaft 34 of the transmission of the engine 10 and the rear wheel 3.

Figure 3:
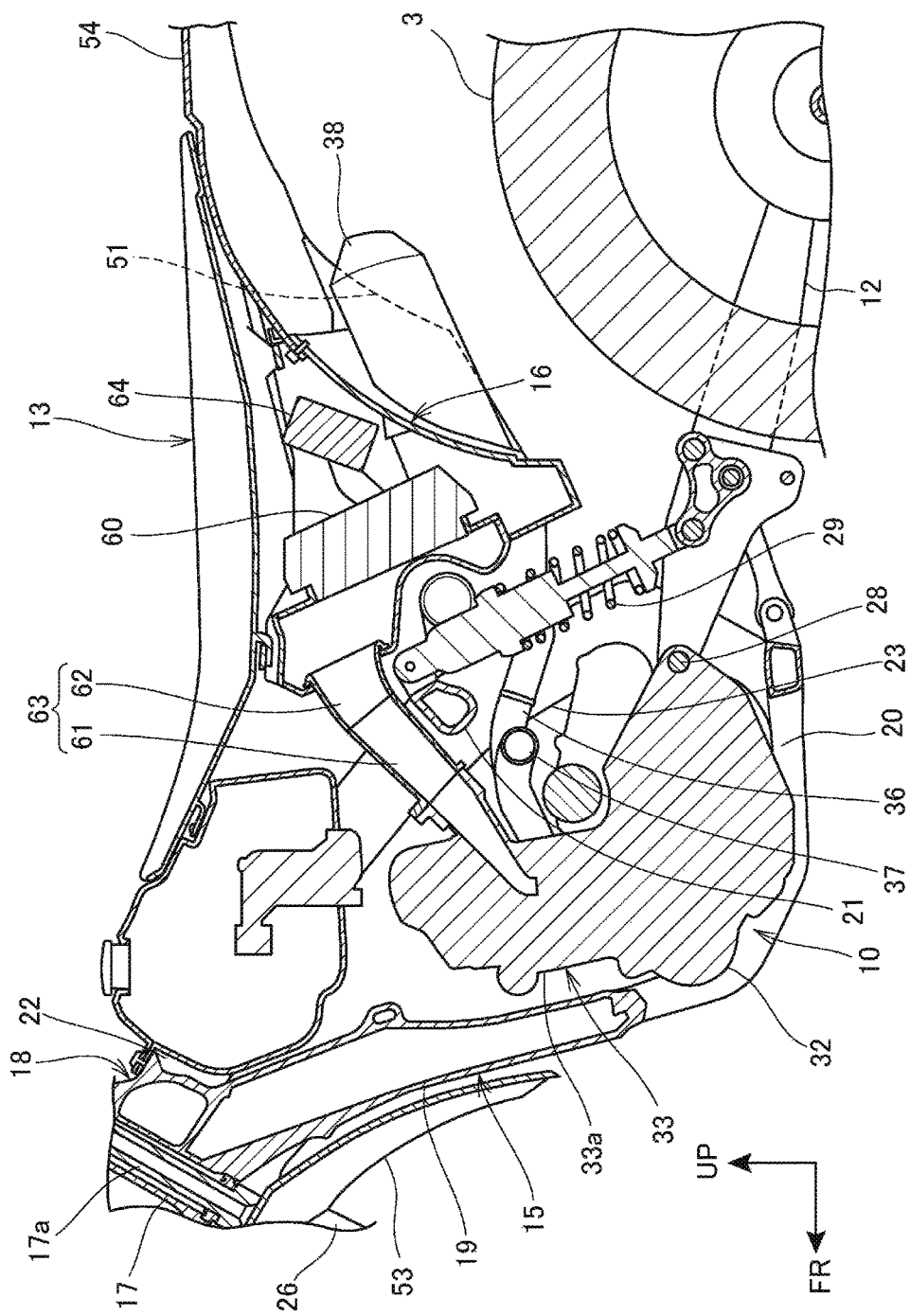
FIG. 3 is a sectional view taken along line III-III of FIG. 2.

An exhaust pipe 40 (FIG. 4) of the engine 10 is led out forward from an exhaust port at a front surface of the cylinder head 33a, extends toward one side (right side) in regard of the transverse direction, is then bent toward the rear side, extends rearward while passing a right side of the cylinder section 33, and is branched on the rear side of the cylinder section 33 into a one-side exhaust pipe 36 on the right side and an other-side exhaust pipe 37 on the left side. The one-side exhaust pipe 36 extends rearward while passing the right side of the vehicle body, and is connected to a one-side muffler 38 (FIG. 3). The other-side exhaust pipe 37 extends rearward while passing the left side of the vehicle body, and is connected to an other-side muffler 39. The one-side muffler 38 and the other-side muffler 39 are disposed in the manner of being divided to the left and right sides of the rear wheel 3, on an upper side of the rear wheel 3.

The motorcycle 1 is provided with a pair of left and right plate-shaped radiators 41L and 41R for radiating cooing water for the engine 10. The radiators 41L and 41R are disposed in the manner of being separated to the left and right sides of the down frame 19, on the front side of the cylinder section 33.

A fuel tank 42 is disposed between the head pipe 17 and a seat 13 and between the left and right main frames 18, and is supported by the main frames 18. An upper portion of the fuel tank 42 is bulged upward to above upper surfaces of the main frames 18.

The seat 13 extends rearward along an upper surface of the rear frame 16 from a rear portion of the fuel tank 42. The seat 13 is supported from below by the fuel tank 42 and the rear frame 16.

Footrests 43 on which to place the driver's feet are provided in a left-right pair at lower end portions of the pivot frames 23.

The motorcycle 1 is provided with a pair of left and right radiator shrouds 50 and a pair of left and right side covers 51, as a body cover for covering the vehicle body.

The radiator shrouds 50 are plate-shaped covers that cover the radiators 41L and 41R, an upper portion of the down frame 19, the main tubes 22, and the fuel tank 42 from outer sides. The radiator shrouds 50 are fixed to the radiators 41L and 41R, the main tubes 22, and the fuel tank 42 by fixtures.

The side covers 51 cover the one-side muffler 38 and the other-side muffler 39 from outer sides individually. The side covers 51 are attached to outside surfaces of the rear frame 16.

The radiator shrouds 50 and the side covers 51 are formed from fiber-reinforced resin.

In addition, the motorcycle 1 is provided with a front fender 53 that is attached to the front fork 11 and covers the front wheel 2 from above, a rear fender 54 that covers the rear wheel 3 from above, and a front cover 55 that covers upper portions of the fork tubes 26 from the front side.

The front fender 53 and the front cover 55 are formed from resin such as polypropylene.

FIG. 3 is a sectional view taken along line III-III of FIG. 2.

An intake device of the engine 10 includes the rear frame 16 functioning as an air cleaner box, an air cleaner element 60 disposed in an air chamber inside the rear frame 16, a throttle body 61 connected to an intake port at a rear surface of the cylinder head 33a, and a connecting tube 62 interconnecting the rear frame 16 and the throttle body 61.

An intake passage 63 composed of the connecting tube 62 and the throttle body 61 rectilinearly extends forwardly downward on an upper side of the cross frame 21 from the rear frame 16, and is connected to the cylinder head 33a.

A battery 64 for supplying electric power to the engine 10 and the like is accommodated in the rear frame 16.

The rear suspension 29 is disposed between the other-side exhaust pipe 37 and the rear frame 16, in the longitudinal direction, and on the lower side of the intake passage 63.

Figure 4:
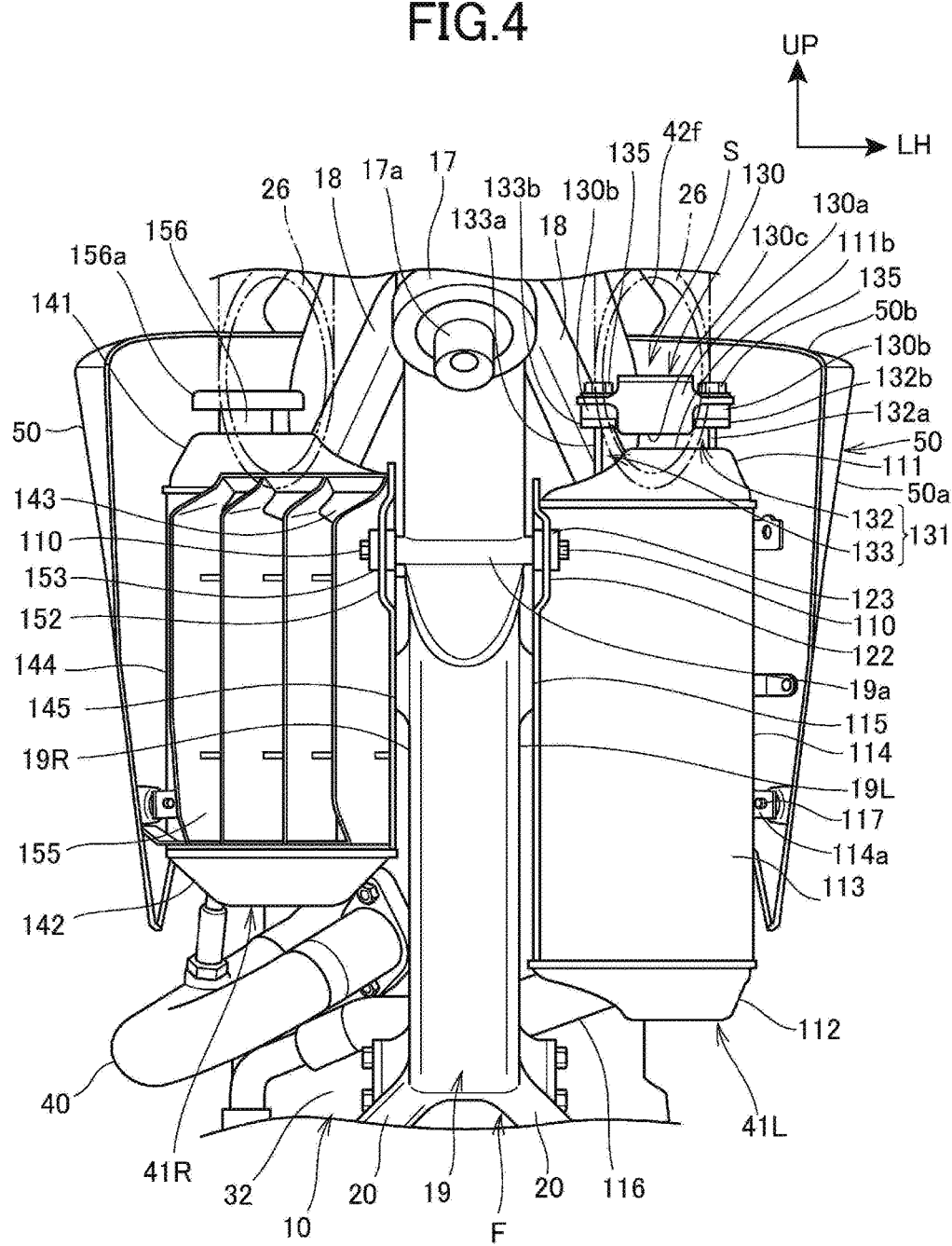
FIG. 4 is a sectional view taken along line IV-IV of FIG. 1, and is a sectional view of a peripheral part of a radiator as viewed from the front side.

FIG. 4 is a sectional view taken along line IV-IV of FIG. 1, and is a sectional view of a peripheral part of the radiators 41L and 41R as viewed from the front side.

Referring to FIGS. 1 and 4, the radiators 41L and 41R are each formed in a substantially rectangular plate-like shape longer in the longitudinal direction of the vehicle than in the transverse direction, and are disposed in an erect posture such that their radiating surfaces (which are surfaces in the plate thickness direction) face toward the front side of the motorcycle 1.

The radiators 41L and 41R are juxtaposed on the left and right sides of the down frame 19, and overlap with an outside surface of the down frame 19 in side view. The radiators 41L and 41R are disposed rather slightly tilted forward than vertical in such a manner that they extend along the down frame 19.

The radiators 41L and 41R are disposed on a rear lower side of the head pipe 17 and on the lower side of front end portions of the main frames 18; in the longitudinal direction of the vehicle, the radiators 41L and 41R are located between the fork tubes 26 and the cylinder section 33 of the engine 10.

An upper-side mounting section 19a to which upper portions of the radiators 41L and 41R are mounted are provided at a front portion of an upper portion of the down frame 19. The upper-side mounting section 19a is formed in a hollow cylindrical shape extending in the transverse direction, and is provided at both end portions in the transverse direction with female screw portions to which radiator fixing bolts 110 are fastened.

Figure 5:
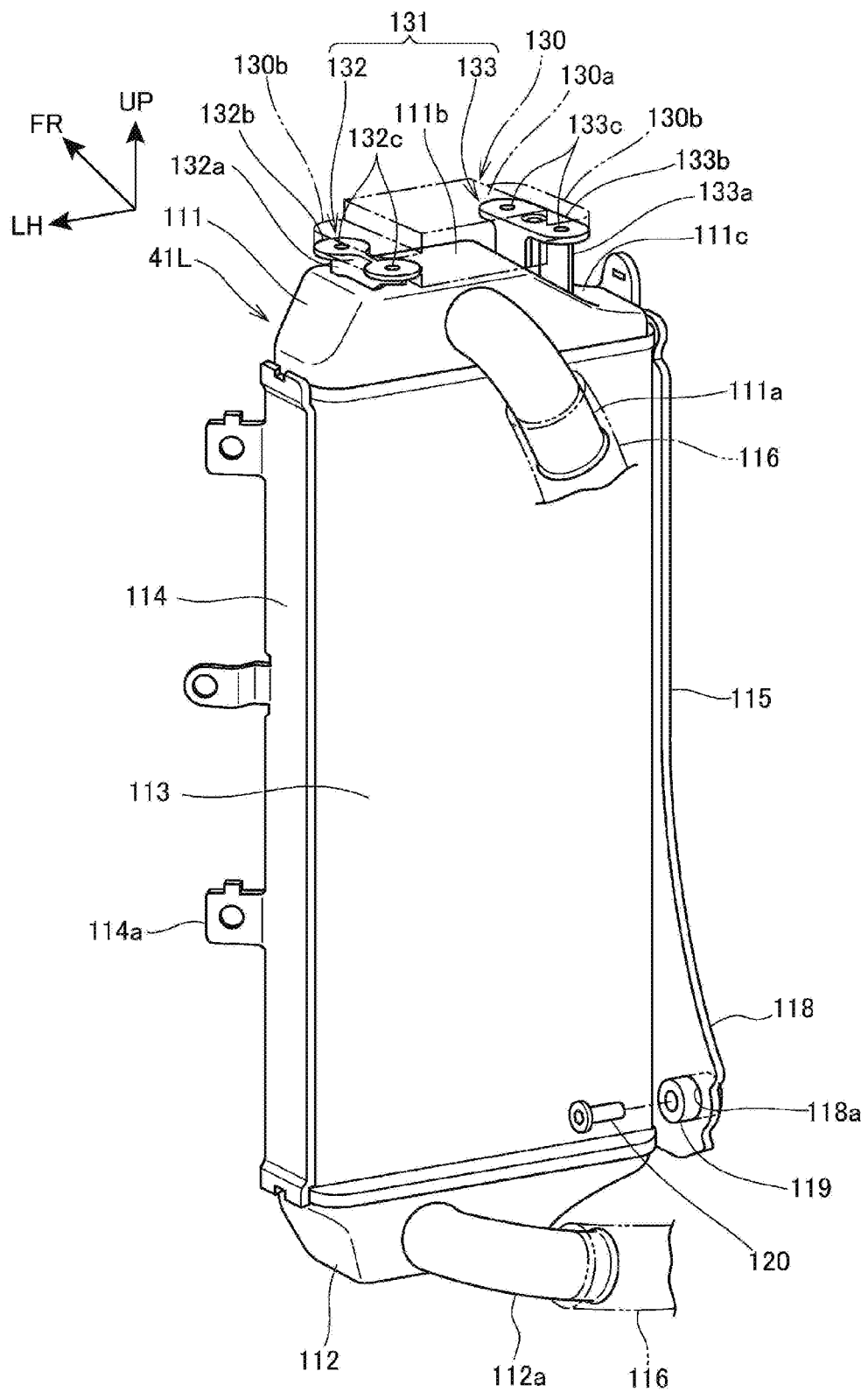
FIG. 5 is a perspective view of a left-side radiator as viewed from the rear side.

FIG. 5 is a perspective view of the left-side radiator 41L as viewed from a rear side. Referring to FIGS. 4 and 5, the radiator 41L on the other side (left side) in the transverse direction is disposed between the radiator shroud 50 on the left side and an other-side side surface 19L of the down frame 19.

The radiator 41L includes an upper tank 111 provided at an upper end portion of the radiator 41L, a lower tank 112 provided at a lower end portion of the radiator 41L, and a core 113 that vertically interconnects the upper tank 111 and the lower tank 112.

Cooling water is stored in the upper tank 111 and the lower tank 112. The core 113 is formed in a plate-like shape, while being provided with a plurality of cooling water tubes establishing communication between the upper tank 111 and the lower tank 112, and a plurality of cooling fins provided in the peripheries of the cooling tubes. Besides, the core 113 is provided with an outside plate portion 114 that covers the cooling fins from an outer side, and an inside plate portion 115 that covers the cooling fins from an inner side.

The radiator 41L, the radiator 41R, and the engine 10 are interconnected by a radiator hose 116, and the cooling water for the engine 10 is fed under pressure by a water pump provided on the crankcase 32 and circulated between the engine 10 and the radiators 41L and 41R through the radiator hose 116.

A pipe-shaped upper-side hose connection section 111*a* for connection of the radiator hose 116 is provided at a rear surface portion of the upper tank 111. A pipe-shaped lower-side hose connection section 112*a* for connection of the radiator hose 116 is provided at a rear surface portion of the lower tank 112.

The radiator 41L is provided at a lower portion thereof with a cover fixing portion 114*a* extending forward from the outside plate portion 114. A lower end portion of a front portion of the radiator shroud 50 is fixed to the radiator 41L by a cover fixing bolt 117 inserted and passed through the radiator shroud 50 from an outer side and fastened to the cover fixing portion 114*a*.

The radiator 41L is provided with a stay section 118 extending rearward from a lower portion of the inside plate portion 115. The stay section 118 is provided therein with a hole 118*a* penetrating the stay section 118 in the transverse direction, and an outer circumferential portion of a hollow cylindrical collar 119 (elastic body) composed of an elastic body is fitted in the hole 118*a*. The collar 119 is a vibration isolating member, and is formed of rubber, for example.

A lower portion of the radiator 41L is fastened to a lower-side mounting portion (not depicted) of the down frame 19, by a radiator fixing bolt 120 inserted and passed through an inner circumferential portion of the collar 119 from the outer side in the transverse direction. The lower-side mounting portion is formed at a lower portion of the down frame 19, and is provided with a female screw portion to which the radiator fixing bolt 120 is fastened.

As depicted in FIG. 4, the radiator 41L is provided with a stay section 122 extending forward from an upper portion of the inside plate portion 115. The stay section 122 is provided therein with a hole penetrating the stay section 122 in the transverse direction, and an outer circumferential portion of a hollow cylindrical collar 123 (elastic body) composed of an elastic body is fitted in this hole. The collar 123 is a vibration isolating member, and is formed of rubber, for example.

An upper portion of the radiator 41L is fastened to the upper-side mounting portion 19*a*, by the radiator fixing bolt 110 inserted and passed through an inner circumferential portion of the collar 123 from an outer side in the transverse direction.

In other words, the radiator 41L is elastically supported (rubber-mounted) on the down frame 19 through the collar 119 and the collar 123 which are elastic bodies. Therefore, vibrations transmitted from the vehicle body side to the radiator 41L can be reduced.

The motorcycle 1 is provided with a gyro sensor 130 (electric component) as an electric component. The gyro sensor 130 is a sensor for detecting an angular velocity. Based on a signal obtained from the gyro sensor 130, a control unit (not depicted) of the motorcycle 1 determines the running condition of the motorcycle 1, and controls the motorcycle 1. Based on the signal from the gyro sensor 130, the control unit controls, for example, ignition timing or fuel supply amount, thereby varying output characteristics of the engine 10 or the like.

The radiator 41L is provided, at an upper surface portion 111*b* of the upper tank 111, with electric component support pieces 131 extending upward. The gyro sensor 130 is fixed to the electric component support pieces 131.

Specifically, the gyro sensor 130 is supported through the electric component support pieces 131 on the radiator 41L, which is elastically supported on the down frame 19 through the collar 119 and the collar 123 provided as the elastic bodies, so that the gyro sensor 130 is elastically supported on the down frame 19 through the collar 119 and the collar 123. Therefore, the gyro sensor 130 can be elastically supported by utilizing the collar 119 and the collar 123 for the radiator 41L, so that it is unnecessary to provide an elastic body for exclusive use for the gyro sensor 130, and the gyro sensor 130 can be elastically supported with a simple structure.

The electric component support pieces 131 are provided in plurality in the state of being juxtaposed in the transverse direction on the upper surface portion 111*b*. The electric component support pieces 131 include an outside support piece 132 disposed on the outer side in the transverse direction, and an inside support piece 133 disposed on the transverse-directionally inner side than the outside support piece 132.

The upper surface portion 111*b* of the upper tank 111 is provided, at an inner-side portion in the transverse direction, with a stepped portion 111*c* recessed downward. The inside support piece 133 is formed at the stepped portion 111*c*, and extends upward from a lower position than the outside support piece 132.

The outside support piece 132 is provided with a column portion 132*a* extending upward from the upper surface portion 111*b*, and a support plate portion 132*b* provided at an upper end of the column portion 132*a*. The column portion 132*a* is formed in the shape of a wall elongated in the longitudinal direction of the vehicle in top view, and the support plate portion 132*b* is provided at an upper end of this wall portion.

The support plate portion 132*b* is provided substantially horizontally. An upper surface of the support plate portion 132*b* is formed with fixing holes 132*c* disposed in plurality while being juxtaposed in the longitudinal direction of the vehicle.

The inside support piece 133 is provided with a column portion 133*a* extending upward from the stepped portion 111*c* of the upper surface portion 111*b*, and a support plate portion 133*b* provided at an upper end of the column portion 133*a*. The column portion 133*a* is formed in the shape of a wall elongated in the longitudinal direction of the vehicle in top view, and the support plate portion 133*b* is provided at an upper end of this wall portion.

The support plate portion 133*b* is provided substantially horizontally at substantially the same height position as the support plate portion 132*b*. An upper surface of the support plate portion 133*b* is formed with fixing holes 133*c* disposed in plurality while being juxtaposed in the longitudinal direction of the vehicle.

Electric component fixing bolts 135 are fastened to the fixing holes 132*c* and the fixing holes 133*c*.

Figure 6:
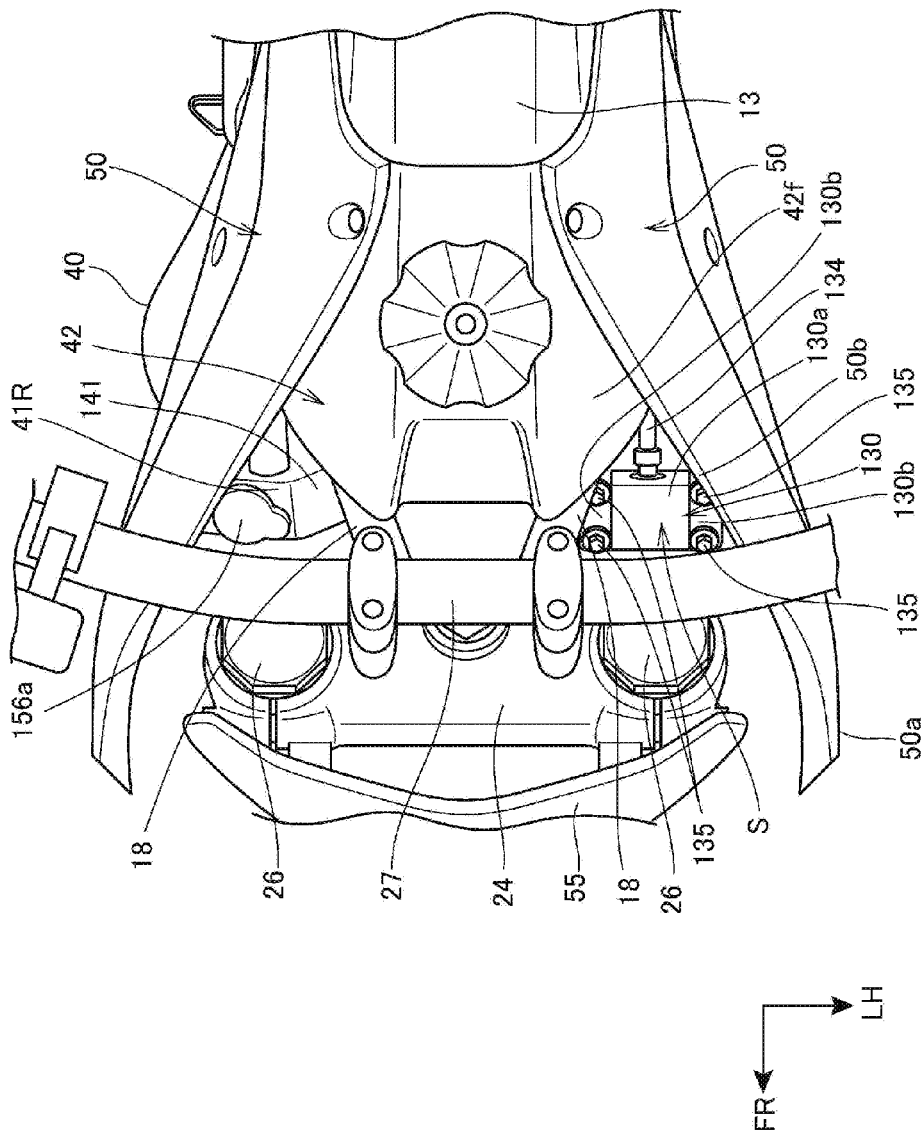
FIG. 6 is a plan view of a peripheral part of a fuel tank as viewed from above.

FIG. 6 is a plan view of a peripheral part of the fuel tank 42 as viewed from above. Referring to FIGS. 4 to 6, the gyro sensor 130 includes a main body section 130*a* formed in a substantially rectangular box shape in top view, and stay sections 130*b* extending in the transverse direction from both side surfaces of the main body section 130*a*. A detection section for angular velocity is accommodated in the main body section 130*a*. A cable 134 for transmitting a signal to the control unit and the like is connected to a rear surface of the gyro sensor 130.

The gyro sensor 130 has its stay sections 130*b* placed from above onto the support plate portion 132*b* and the support plate portion 133*b* of the electric component support pieces 131, and is fixed to the outside support piece 132 and the inside support piece 133 by the plurality of electric component fixing bolts 135 inserted and passed through the stay sections 130*b* from above. In this state, the main body section 130*a* is located between the outside support piece 132 and the inside support piece 133, and a lower surface 130*c* of the main body section 130*a* is spaced upward from the upper surface portion 111*b* of the upper tank 111.

Thus, a space is provided between the gyro sensor 130 and the surface of the upper surface portion 111*b* of the upper tank 111, whereby the quantity of heat transferred from the radiator 41L to the gyro sensor 130 can be reduced.

As depicted in FIGS. 4 and 6, a space S which is covered from the transverse-directionally outer side by a front end portion 50*a* of the radiator shroud 50, is covered from the transverse-directionally inner side by the other-side side surface 19L of the down frame 19, is covered from the rear side by the front side portion 42*f* of the fuel tank 42, and is covered from the front side by an upper portion of the fork tube 26 on the left side is formed on the upper side of the radiator 41L. Further, the space S is covered from the lower side by the upper surface portion 111*b* of the upper tank 111 of the radiator 41L.

The electric component support pieces 131 and the gyro sensor 130 are disposed in the space S. Therefore, the gyro sensor 130 can be effectively protected in the manner of surrounding it by the radiator shroud 50, the down frame 19, the fuel tank 42, the fork tube 26, and the radiator 41L.

In addition, an upper end 50*b* of a front portion of the radiator shroud 50 extends upward to above the gyro sensor 130. Therefore, the gyro sensor 130 can be effectively protected by the radiator shroud 50, and the gyro sensor 130 can be hidden behind the radiator shroud 50, so that good external appearance is ensured.

As depicted in FIG. 4, the radiator 41R on one side (right side) in the transverse direction is disposed between the radiator shroud 50 on the right side and a one-side side surface 19R of the down frame 19.

The radiator 41R is provided avoiding the exhaust pipe 40 disposed thereunder, and is formed to have a vertical length smaller than the vertical length of the radiator 41L. Therefore, a lower end portion of the radiator 41R is located above a lower end portion of the radiator 41L.

In addition, the radiator 41R is disposed between a front side portion 42*f* (FIG. 6) of the fuel tank 42 and the fork tube 26 on the right side.

Basic configuration of the radiator 41R is similar to that of the radiator 41L, and the radiator 41R includes an upper tank 141, a lower tank 142, a core 143, an outside plate portion 144, and an inside plate portion 145.

The radiator 41R is provided with a stay section 152 extending forward from an upper portion of the inside plate portion 145. The stay section 152 is provided therein with a hole penetrating the stay section 152 in the transverse direction, and an outer circumferential portion of a hollow cylindrical collar 153 composed of an elastic body is fitted in this hole. The collar 153 is a vibration isolating member, and is formed of rubber, for example.

An upper portion of the radiator 41R is fastened to an upper-side mounting portion 19*a* of the down frame 19, by the radiator fixing bolt 110 inserted and passed through an inner circumferential portion of the collar 153 from the transverse-directionally outer side.

In addition, a lower portion of the radiator 41R is provided with a stay section (not depicted) extending rearward from a lower portion of the inside plate portion 145, and is fastened to the down frame 19 through a collar (not depicted) which is a vibration isolating member fitted in this stay section.

In other words, the radiator 41R is elastically supported on the down frame 19 through the collar 153 and the like.

The radiator 41R is provided with louvers 155 on a front surface thereof. The louvers 155 cover and protect the core 143 from the front side, and rectify airflow that flows to the core 143. Note that while louvers are also provided on the front surface of the radiator 41L, they are not illustrated in FIG. 4.

A water supply port 156 is provided at an upper surface of the upper tank 141 of the radiator 41R. A worker detaches a cap 156*a* closing the water supply port 156, and replenishes cooling water into the radiator 41R through the water supply port 156.

Since the radiator 41R and the radiator 41L are interconnected by a radiator hose 116, the cooling water poured in through the water supply port 156 is replenished also into the radiator 41L.

In the present embodiment, of the left and right radiators 41L and 41R, the radiator 41L not provided with the water supply port 156 at an upper surface thereof is provided with the electric component support pieces 131, so that the gyro sensor 130 can be supported through efficient utilization of the space S on the upper side of the radiator 41L.

As has been described above, according to the embodiment to which the present invention is applied, the motorcycle 1 includes the body frame F supporting the water-cooled engine 10, and the radiator 41L supported on the body frame F through the collars 119 and 123, and the gyro sensor 130 is fixed to the electric component support pieces 131 provided on the radiator 41L. As a result, the gyro sensor 130 fixed to the radiator 41L by the electric component support pieces 131 is supported on the body frame F through the collars 119 and 123 for the radiator 41L, so that it is unnecessary to provide an elastic body for exclusive use for the gyro sensor 130, and the gyro sensor 130 can be elastically supported with a simple structure.

Note that for further reduction of vibration, a vibration isolating member may be provided between the electric component support pieces 131 and the gyro sensor 130.

In addition, the body frame F includes the head pipe 17 supporting the front wheel 2 through the front fork 11, and the down frame 19 extending downward from the head pipe 17, and the radiator 41L is disposed on a lateral side of the down frame 19. Therefore, the gyro sensor 130 can be elastically supported on the lateral side of the down frame 19 by utilizing the radiator 41L.

Besides, the radiator 41L includes the upper tank 111 provided at an upper portion, the lower tank 112 provided at a lower portion, and the core 113 interconnecting the upper tank 111 and the lower tank 112, and the electric component support pieces 131 are provided on the upper tank 111. Owing to this configuration, the gyro sensor 130 can be disposed at a high position, and staining of the gyro sensor 130 can be restrained.

Further, the fuel tank 42 is provided on the rear side of the radiator 41L, and the radiator shroud 50 is provided on the lateral outer side of the radiator 41L. The gyro sensor 130 is disposed in the space S which is covered with the radiator shroud 50 on the lateral outer side, covered with the fuel tank 42 on the rear side, and covered with the radiator 41L on the lower side. Therefore, the gyro sensor 130 can be effectively protected in the manner of covering it with the radiator shroud 50, the fuel tank 42 and the radiator 41L.

In addition, since the upper end 50b of the radiator shroud 50 extends upward to above the gyro sensor 130, the gyro sensor 130 can be effectively covered by the radiator shroud 50, and the gyro sensor 130 can be protected by the radiator shroud 50.

Besides, the radiators 41L and 41R are provided in a pair on the left and right sides of the down frame 19, the water supply port 156 is provided at the upper surface of the radiator 41R on one side, and the electric component support pieces 131 are provided at the upper surface of the radiator 41L on the other side. Therefore, the gyro sensor 130 can be supported through effective utilization of the space near the upper surface of the radiator 41L not provided with the water supply port 156.

In addition, since the electric component support pieces 131 are provide projecting from the surface of the radiator 41L and the gyro sensor 130 is supported in the state of being spaced from the surface of the radiator 41L, the quantity of heat transferred from the radiator 41L to the gyro sensor 130 can be reduced.

Note that the above-described embodiment merely shows a mode of application of the present invention, and the present invention is not limited to the above embodiment.

While the gyro sensor 130 has been depicted as an example of the electric component supported by the electric component support pieces 131 in the above embodiment, the present invention is not limited to this, and a configuration may be adopted in which other electric component is supported. For example, a configuration may be adopted in which a sensor for detecting the acceleration of a saddle ride vehicle, a sensor for detecting the posture of a saddle ride vehicle, a sensor for detecting ambient temperature of a saddle ride vehicle, a global positioning system (GPS) receiver, a display device, an imaging device, a communication device or the like is supported by the electric component support pieces 131.

In addition, while the electric component support pieces 131 have been described to be provided on the upper tank 111 in the above embodiment, this is not restrictive, and the electric component support pieces 131 may be provided on the lower tank 112 of the radiator 41L or on a side surface portion.

Besides, a configuration may be adopted in which a radiator on the other side, of the radiators juxtaposed on the left and right sides, is provided on a downstream side of the core of the radiator on one side, and the gyro sensor is supported by the radiator on the other side. In this case, since the radiator on the other side is at a lower temperature than the radiator on one side, influences of heat on the gyro sensor can be reduced.

In addition, while the motorcycle 1 has been described as an example in the above embodiment, this is not restrictive of the present invention. The present invention is also applicable to three-wheeled saddle ride vehicles having two front wheels or rear wheels, saddle ride vehicles having four or more wheels, and such saddle ride vehicles as motor scooters.

DESCRIPTION OF REFERENCE SYMBOLS

1 Motorcycle (Saddle ride vehicle)
2 Front wheel
10 Engine
11 Front fork
17 Head pipe
19 Down frame
41L Radiator (Radiator on the other side)
41R Radiator (Radiator on one side)
42 Fuel tank
50 Radiator shroud
50b Upper end
111 Upper tank
112 Lower tank
113 Core
119, 123 Collar (Elastic body)
130 Gyro sensor (Electric component)
131 Electric component support piece
156 Water supply port
F Body frame
S Space

The invention claimed is:

1. An electric component support structure for a saddle ride vehicle comprising:
   a body frame that supports a water-cooled engine; and
   a radiator supported on the body frame through an elastic body,
   wherein an electric component is fixed to an electric component support piece provided on an upper surface of the radiator.

2. The electric component support structure for a saddle ride vehicle according to claim 1, wherein the body frame includes a head pipe that supports a front wheel through a front fork, and a down frame extending downward from the head pipe,
   and wherein the radiator is disposed on a lateral side of the down frame.

3. The electric component support structure for a saddle ride vehicle according to claim 1, wherein the radiator includes an upper tank provided at an upper portion, a lower tank provided at a lower portion, and a core interconnecting the upper tank and the lower tank,
   and wherein the electric component support piece is provided on the upper tank.

4. The electric component support structure for a saddle ride vehicle according to claim 1, wherein a fuel tank is provided on a rear side of the radiator, and a radiator shroud is provided on a lateral outer side of the radiator,
   and wherein the electric component is disposed in a space that is covered with the radiator shroud on a lateral outer side, covered with the fuel tank on a rear side, and covered with the radiator on a lower side.

5. The electric component support structure for a saddle ride vehicle according to claim 4, wherein an upper end of the radiator shroud extends upward to an area above the electric component.

6. The electric component support structure for a saddle ride vehicle according to claim 2, wherein the radiator is one of a pair of radiators which are provided on left and right sides of the down frame, and wherein a water supply port is provided at an upper surface of the radiator on one side, and the electric component support piece is provided at the upper surface of the radiator on another side thereof.

7. The electric component support structure for a saddle ride vehicle according to claim 1, wherein the electric component support piece is provided projecting from the upper surface of the radiator, and wherein the electric component is spaced away from the upper surface of the radiator.

8. A saddle ride vehicle comprising:
a body frame that supports a water-cooled engine thereon; and
a radiator supported on the body frame through an elastic body,
wherein:
    a water supply port is provided on an upper surface of the radiator on one side thereof,
    and an electric component is fixed to an electric component support piece provided on the upper surface of the radiator on another side thereof.

* * * * *